UNITED STATES PATENT OFFICE.

NATHAN CRABTREE, OF FALL RIVER, MASSACHUSETTS.

IMPROVEMENT IN COMPOSITIONS FOR SIZING.

Specification forming part of Letters Patent No. 187,218, dated February 13, 1877; application filed November 13, 1876.

*To all to whom it may concern:*

Be it known that I, NATHAN CRABTREE, of Fall River, of the county of Bristol, of the State of Massachusetts, have invented a new and useful Composition for Sizing Cotton Warps, and do hereby declare the same to be fully described, as follows:

Its component parts are starch, soap, glycerine, sal-soda, and water.

In preparing the composition I usually first make a composition of three-quarters of a pound of common soap, one ounce of glycerine, and one pound of sal-soda to each gallon of water I use for their union. Having placed the said ingredients into the water, I boil it for about half an hour, stirring the liquid in the meantime, if necessary, to facilitate the proper formation of the solution.

To each twelve pounds of the solution there should be added one hundred pounds of the starch, and the whole should be agitated until the solution and the starch may be thoroughly incorporated. The composition has been found in practice to operate to excellent advantage and to afford great satisfaction.

I do not confine the composition to the precise proportions of its ingredients as stated, as such may be varied somewhat without materially changing the character of the sizing produced.

I claim—

The described composition, consisting of starch, soap, glycerine, sal-soda, and water, such being for the purpose set forth.

NATHAN CRABTREE.

Witnesses:
R. H. EDDY,
J. R. SNOW.